US008640469B2

(12) United States Patent
Mackin

(10) Patent No.: US 8,640,469 B2
(45) Date of Patent: Feb. 4, 2014

(54) AIRCRAFT SUPPLEMENTAL LIQUID COOLER AND METHOD

(75) Inventor: Steven G. Mackin, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 385 days.

(21) Appl. No.: 13/205,366

(22) Filed: Aug. 8, 2011

(65) Prior Publication Data
US 2013/0037234 A1 Feb. 14, 2013

(51) Int. Cl.
B60H 1/32 (2006.01)

(52) U.S. Cl.
USPC .................................. 62/61; 62/244

(58) Field of Classification Search
USPC ................. 62/61, 239, 244, 434, 448; 165/41
See application file for complete search history.

(56) References Cited

U.S. PATENT DOCUMENTS 2,930,553 A * 3/1960 Greenough ................ 244/118.5
4,637,222 A * 1/1987 Fujiwara et al. ................ 62/244
6,216,981 B1 * 4/2001 Helm .......................... 244/118.5
6,845,627 B1 * 1/2005 Buck ................................ 62/185
7,523,622 B2 * 4/2009 Zywiak et al. .................. 62/244
2008/0314060 A1 12/2008 Parikh
2009/0125167 A1 5/2009 Ma
2009/0260387 A1 10/2009 DeFrancesco
2011/0107777 A1 5/2011 Atkey

OTHER PUBLICATIONS

Wikipedia, "Environmental Control System", retrieved Jul. 7, 2011.
Wikipedia, "Air cycle machine", retrieved Jul. 7, 2011.

* cited by examiner

Primary Examiner — Melvin Jones

(57) ABSTRACT

An aircraft may include an interior and a deployable liquid cooler. The deployable liquid cooler may include a deployable heat exchanger that may be fluidly coupled to at least one heat source of the aircraft. The deployable liquid cooler may receive a cooling system fluid from the heat source for circulation through the deployable heat exchanger. The deployable heat exchanger may be movable between a stowed position in the aircraft interior and a deployed position outside the aircraft. The deployable heat exchanger may transfer heat of the cooling system fluid to an environment outside of the aircraft when the deployable heat exchanger is in the deployed position.

20 Claims, 8 Drawing Sheets

AIRCRAFT SUPPLEMENTAL LIQUID COOLER AND METHOD

FIELD

The present disclosure relates generally to cooling systems, and more particularly, to systems and methods for improving the cooling capacity of an aircraft cooling system.

BACKGROUND

Transport aircraft typically include an environmental control system having one or more cooling systems for thermal management of the various systems of the aircraft. For example, an aircraft may include one or more air conditioning packs for controlling the temperature of the cabin and the cargo holds, and one or more galley chillers for temperature control of the galley carts which may contain perishable items. The aircraft may also include a power electronics cooling system (PECS) for cooling a high voltage direct current (HVDC) equipment rack of the aircraft. The HVDC may provide electrical power to various electronic components and devices on the aircraft. The PECS may circulate a cooling system fluid through the HVDC for maintaining the temperature of the HVDC within acceptable limits.

The aircraft may include a ram air circuit that may be fluidly coupled to the PECS for cooling the cooling system fluid. Air from outside the aircraft may be drawn into one or more adjustable ram air inlets mounted to the aircraft exterior surfaces. The ram air inlets may be configured to increase the pressure of the air drawn into the ram air inlets due to forward movement of the aircraft during flight. The air may be routed across one or more ram air heat exchangers for absorbing heat from the cooling system fluid. The heated air may then be discharged from the aircraft through one or more ram air outlets.

When the aircraft is moving at a relatively high speeds (e.g., 500-600 mph) at a cruising altitude where the ambient temperature is relatively cold (e.g., −50° F.), relatively large quantities of cold air may be drawn into the ram air circuit and may absorb a relatively large quantity of heat from the cooling system fluid. When the aircraft is parked on the ground and the ambient air temperature is relatively mild, a ram air fan may be activated to draw air into the ram air inlets and across the heat exchangers for maintaining the temperature of the cooling system fluid within acceptable limits.

However, when the ambient air temperature on the ground is relatively high, the ram air circuit may have a limited capacity for absorbing heat from the cooling system fluid. The reduced heat absorption capacity of the ram air circuit may affect the ability of the aircraft cooling systems to maintain the temperature of the HVDC, the air conditioning packs, and the galley chillers within operational limits. Although the temperature control capability of the aircraft cooling system may be improved by increasing the size of the ram air circuit, the confined space within the aircraft limits the extent to which the ram air circuit may be physically increased in size.

As can be seen, there exists a need in the art for a system and method for cooling the various aircraft systems when the aircraft is on the ground and the ambient air temperature is relatively high.

SUMMARY

The above-noted needs associated with aircraft cooling systems are specifically addressed and alleviated by the present disclosure which, in an embodiment, provides a deployable liquid cooler for an aircraft. The deployable liquid cooler may include a deployable heat exchanger that may be fluidly coupled to at least one heat source of the aircraft. The deployable heat exchanger may receive cooling system fluid from the heat source for circulation through the deployable heat exchanger. The deployable heat exchanger may be movable between a stowed position in an interior of the aircraft and a deployed position outside of the aircraft. The deployable heat exchanger may transfer heat of the cooling system fluid to an environment outside of the aircraft when the deployable heat exchanger is in the deployed position.

In a further embodiment, disclosed is an aircraft which may include an interior and a deployable liquid cooler. The deployable liquid cooler may include a deployable heat exchanger that may be fluidly coupled to at least one heat source and/or cooling system of the aircraft. The deployable heat exchanger may receive cooling system fluid from the heat source and/or the cooling system for circulation through the deployable heat exchanger. The deployable heat exchanger may be movable between a stowed position in the aircraft interior and a deployed position outside of the aircraft. The deployable heat exchanger may transfer heat of the cooling system fluid to an environment outside of the aircraft when the deployable heat exchanger is in the deployed position.

Also disclosed is a method of cooling a heat source of an aircraft having an aircraft cooling system containing a cooling system fluid. The method may include moving a deployable heat exchanger from a stowed position in an interior of the aircraft to a deployed position outside of the aircraft. The method may further include circulating the cooling system fluid through the deployable heat exchanger. In addition, the method may include absorbing heat from the deployable heat exchanger into a cooling medium. The steps may further include cooling the cooling system fluid circulation through the deployable heat exchanger in response to absorbing heat into the cooling medium.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein.

DETAILED DESCRIPTION

Figure 1:
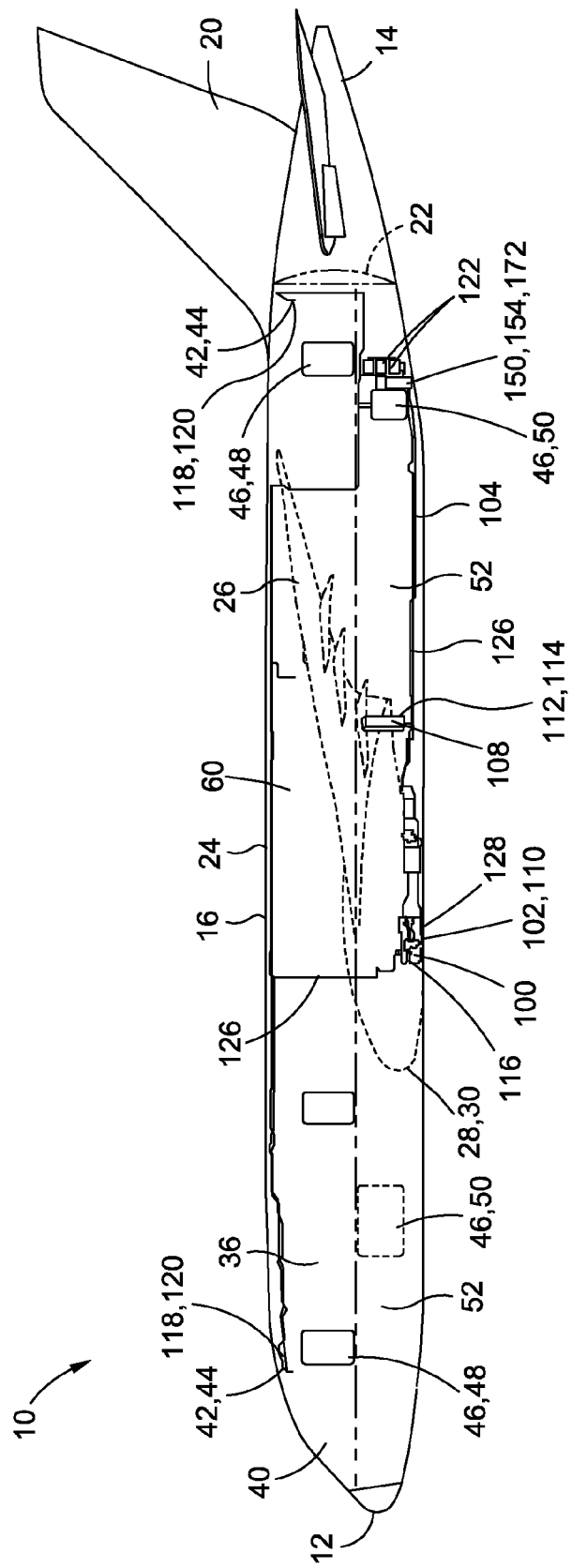
FIG. 1 is a side view of an aircraft having at least one aircraft cooling system and further illustrating an embodiment of a deployable liquid cooler that may be coupled to the aircraft cooling system for cooling a heat source of the aircraft.

Referring now to the drawings wherein the showings are for purposes of illustrating various embodiments of the disclosure, shown in FIG. 1 is an aircraft 10 which may include a deployable liquid cooler 150 for cooling one or more heat sources 108 of the aircraft 10. The deployable liquid cooler 150 may comprise a deployable heat exchanger 154 which may be fluidly coupled to the heat source 108 and/or to a cooling system 102 for the heat source 108 (e.g., aircraft electrical power system 112, high voltage direct current (HVDC) rack 114). In an embodiment, the deployable liquid cooler 150 may be mounted within an interior 60 of the aircraft 10 and may be moved from a stowed position 172 (FIG. 5) in the interior 60 (FIG. 5) of the aircraft 10 to a deployed position 174 (FIG. 8) outside 62 (FIG. 8) the aircraft 10. The deployable heat exchanger 154 may receive cooling system fluid 104 from the heat source 108 and/or the aircraft cooling system 102. The cooling system fluid 104 may be circulated through the deployable heat exchanger 154. For example, the cooling system fluid 104 may be circulated through the deployable heat exchanger 154 when the deployable heat exchanger 154 is in the deployed position 174 and exposed to ambient air 164 (FIG. 7) outside 62 (FIG. 8) the aircraft 10.

Advantageously, the deployable heat exchanger 154 may provide improved capacity for cooling the heat source 108 and/or aircraft cooling system 102. In an embodiment, the deployable heat exchanger 154 may be maintained in the stowed position 172 during flight. The deployable heat exchanger 154 may also be maintained in the stowed position 172 during ground operations when the ambient air 164 (FIG. 7) temperature is relatively mild. The deployable heat exchanger 154 may be moved to the deployed position 174 (FIG. 8) outside 62 (FIG. 8) the aircraft 10 such as during ground operations when the ambient air 164 temperature is relatively high (e.g., above 90° F.) such that the ambient air 164 in the outside 62 environment 64 (FIG. 8) may flow across the deployable heat exchanger 154 and reduce the temperature of the cooling system fluid 104. However, the deployable heat exchanger 154 may be moved to the deployed position 174 at any time and is not limited to deployment when the aircraft 10 is on the ground or when the ambient air 164 temperature outside 62 the aircraft 10 is relatively high. When the deployable heat exchanger 154 is in the deployed position 174, the cooling system fluid 104 circulating through the deployable heat exchanger 154 may be cooled by the ambient air 164 outside 62 the aircraft 10 to provide increased cooling capacity for the heat source 108 and/or the aircraft cooling system 102. In this regard, the cooling system fluid 104 may also be circulated through the deployable heat exchanger 154 when the deployable heat exchanger 154 is in the stowed position 172.

Figure 6:
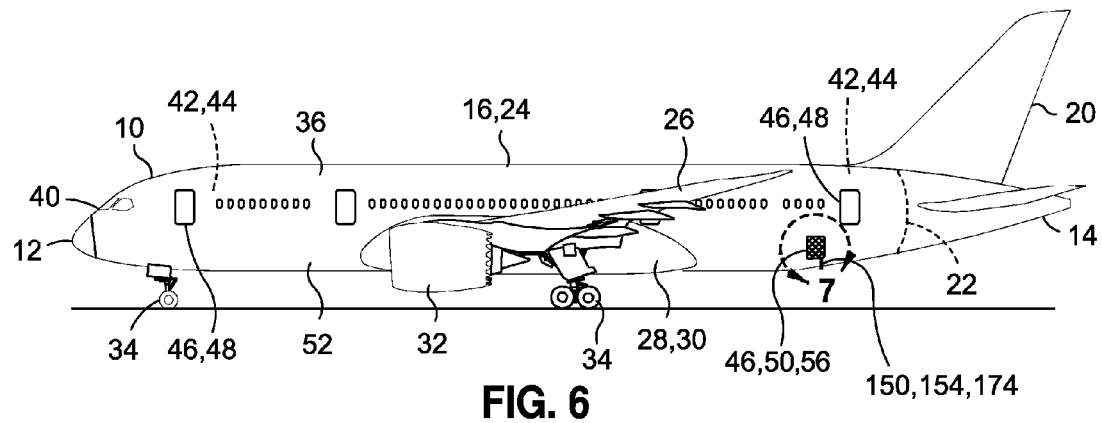
FIG. 6 is a side view of the aircraft on the ground and illustrating the deployable liquid cooler in a deployed position outside the aircraft.

Referring more particularly now to FIG. 1, the aircraft 10 may comprise a fuselage 16 having a forward end 12 and an aft end 14. A flight deck 40 may be located at the forward end 12 of the fuselage 16. The aircraft 10 may include an empennage 20 at the aft end 14 of the fuselage 16 and which may include one or more tail surfaces (not shown) for directional control of the aircraft 10. The aircraft 10 may further include a pair of wings 26, one or more propulsion units 32 (FIG. 2), and landing gear 34 (FIG. 6). The fuselage 16 may include a cabin 36 for housing passengers and the flight crew. The fuselage 16 may further include one or more cargo holds 52. For example, the cargo holds 52 may comprise a forward cargo hold (not shown), an aft cargo hold (not shown), and/or a bulk cargo hold (not shown) although the cargo holds 52 may be comprised of any arrangement and is not limited to a forward cargo hold, aft cargo hold, and bulk cargo hold 52. The fuselage 16 may contain the passenger cabin 36 and the cargo hold(s) 52 and may comprise a pressure vessel 24 bounded on the sides by the fuselage 16 walls and bounded at the aft end 14 by a pressure bulkhead 22. The fuselage 16/pressure vessel 24 may include one or more openings 46 to allow access to the interior 60 of the cabin 36 and the cargo hold(s) 52. For example, the fuselage 16 may include openings 46 for one or more passenger doors 48 and/or openings 46 for one or more cargo doors 50.

It should be noted that although the present disclosure is described in the context of a fixed wing passenger aircraft 10 as illustrated in FIG. 1, it is contemplated that embodiments of the deployable liquid cooler 150 may be applied to aircraft of any configuration, without limitation. For example, the disclosed embodiments may be applied to any civil, commercial or military aircraft and including fixed-wing and rotary-wing aircraft. In addition, the embodiments may be applied to alternative aircraft configurations and is not limited to the tube-and-wing configuration illustrated in FIG. 1. For example, the disclosed embodiments may be applied to hybrid wing-body aircraft.

Figure 2:
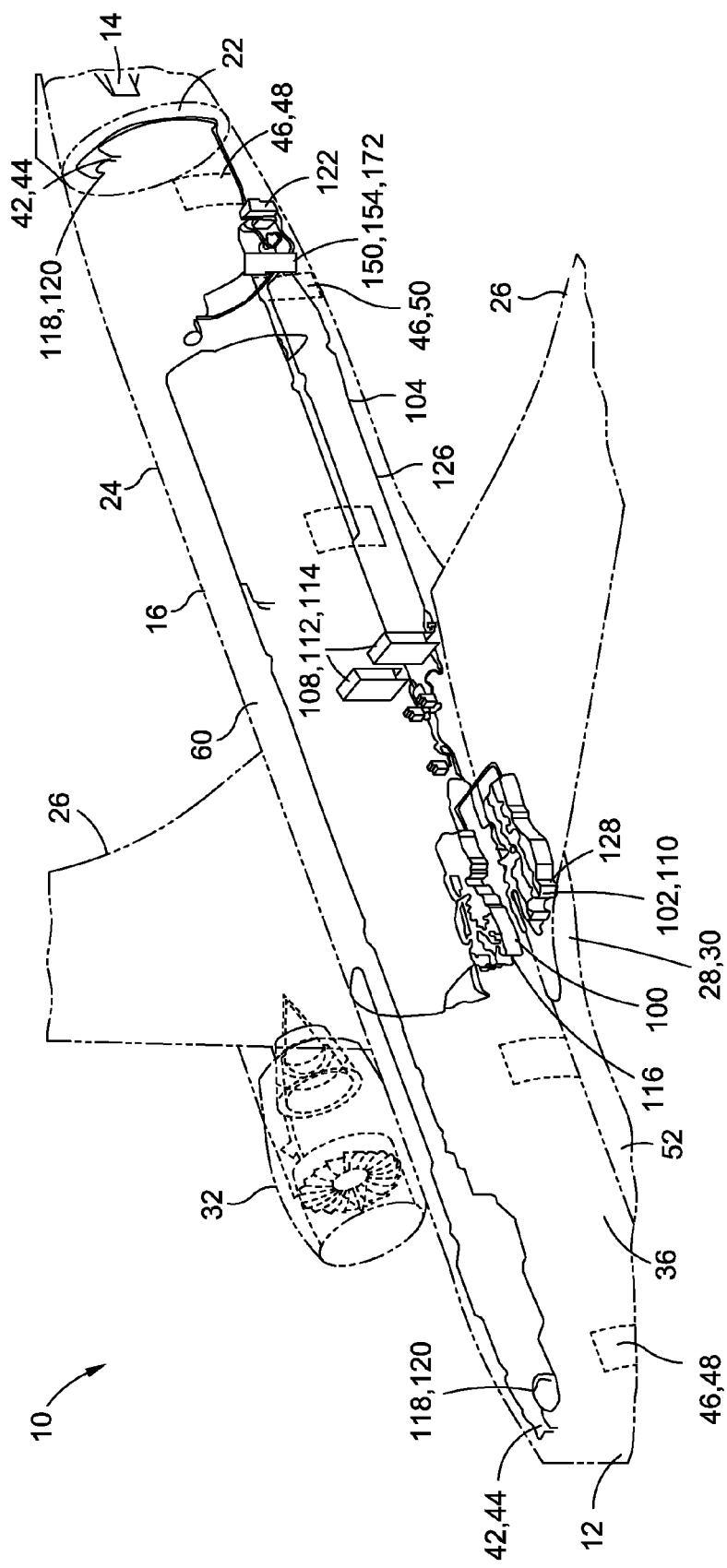
FIG. 2 is a perspective top view of the aircraft taken along line 1 of FIG. 2 and illustrating one or more power electronics cooling systems (PECS) located at a wing-fuselage juncture and further illustrating the deployable liquid cooler mounted adjacent to a cargo door at an aft end of the aircraft.

Referring to FIGS. 1 and 2, the aircraft 10 may include an environmental control system 100 (ECS) for thermal management of the various systems of the aircraft 10. For example, as indicated above, the aircraft 10 may include one or more air conditioning packs 116 which may be located within a wing-fuselage juncture 28 on one or both sides of the aircraft 10 or at other locations of the aircraft 10. The air conditioning packs 116 may provide temperature control and pressurized air for the cabin 36 and/or cargo hold 52. The aircraft 10 may further include one or more aircraft electrical power systems 112. For example, FIGS. 1 and 2 illustrate one or more high voltage direct current (HVDC 114) equipment racks which may provide electrical power to various electronic components and devices on the aircraft 10. The HVDCs 114 may be located within the aircraft 10 such as at the wing-fuselage juncture 28 although the HVDCs 114 may be mounted at any location within the aircraft 10. The HVDCs 114 may be cooled by an aircraft cooling system 102 such as a power electronics cooling system 110 (PECS). The PECS 110 may circulate cooling system fluid 104 through the HVDCs 114 for maintaining the temperature of the HVDCs 114 within acceptable limits.

Figure 10:
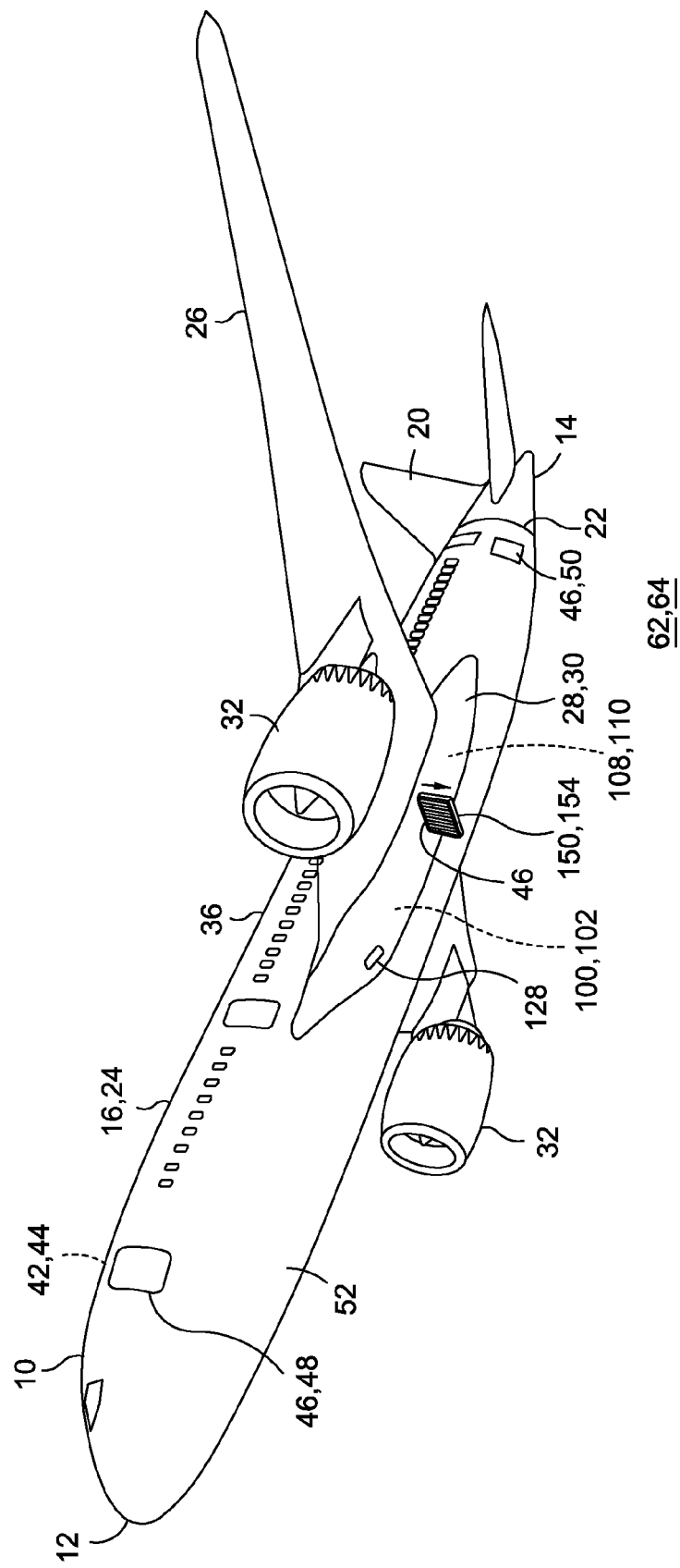
FIG. 10 is a perspective view of an underside of the aircraft and illustrating an embodiment wherein the deployable liquid cooler deployed from within a wing-fuselage fairing of the aircraft.

Referring still to FIGS. 1 and 2, temperature control for the cooling system fluid 104 may at least partially be provided by a ram air circuit 128 that may be located in the wing-fuselage juncture 28 or at another suitable location. The ram air circuit 128 may be fluidly coupled to the air conditioning packs 116 and the PECS 110 and/or other heat sources 108 or aircraft cooling systems 102. Air 134 (FIG. 11) may be drawn from outside 62 (FIG. 8) of the aircraft 10 through one or more ram air inlets 128 (FIG. 10). The air 134 drawn into the ram air circuit 128 may be routed across one or more ram air heat exchangers 130 (FIG. 11) for absorbing heat carried by the cooling system fluid 104 which may be circulated through the air conditioning packs 116 and/or the PECS 110. The heated air 134 may then be discharged out of one or more ram air outlets (not shown).

Referring to FIGS. 1 to 2, the deployable liquid cooler 150 may be contained within the pressure vessel 24 of the fuselage 16. The deployable liquid cooler 150 may preferably be mounted at a location where the deployable liquid cooler 150 may be moved from an interior position 60 of the aircraft 10 to a position outside 62 of the aircraft 10. For example, in one embodiment of a deployable liquid cooler 150 shown in FIGS. 1 and 2, the deployable liquid cooler 150 is shown mounted adjacent to the bulk cargo door 50 toward the aft end 14 of the aircraft 10. As indicated earlier, the deployable liquid cooler 150 may include a deployable heat exchanger 154 that may be fluidly coupled to one or more heat sources 108 of the aircraft 10 such as the aircraft power electronics cooling system 110 (PECS). The deployable heat exchanger 154 may be fluidly coupled to the aircraft cooling system 102 such as the PECS 110 by means of conduit 126. Advantageously, the deployable liquid cooler 150 and the aircraft 10 heat sources 108 and cooling systems 102 may be contained within the pressure vessel 24 to minimize penetrations for passage of the conduit 126 through the pressure vessel 24. As may be appreciated, by minimizing the quantity of penetrations through the pressure vessel 24, complexities associated with sealing the pressure vessel 24 may be reduced.

Figure 3:
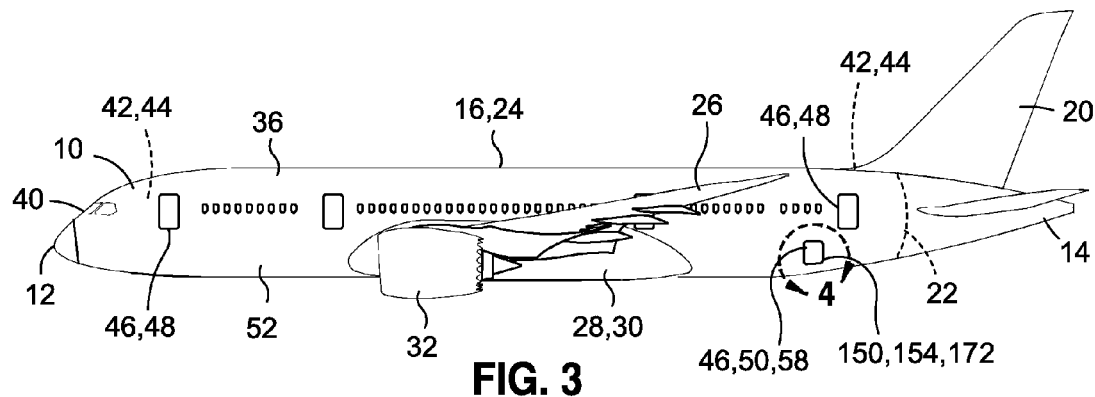
FIG. 3 is a side view of the aircraft in flight and illustrating the deployable liquid cooler in a stowed position in an interior of the aircraft.
Figure 4:
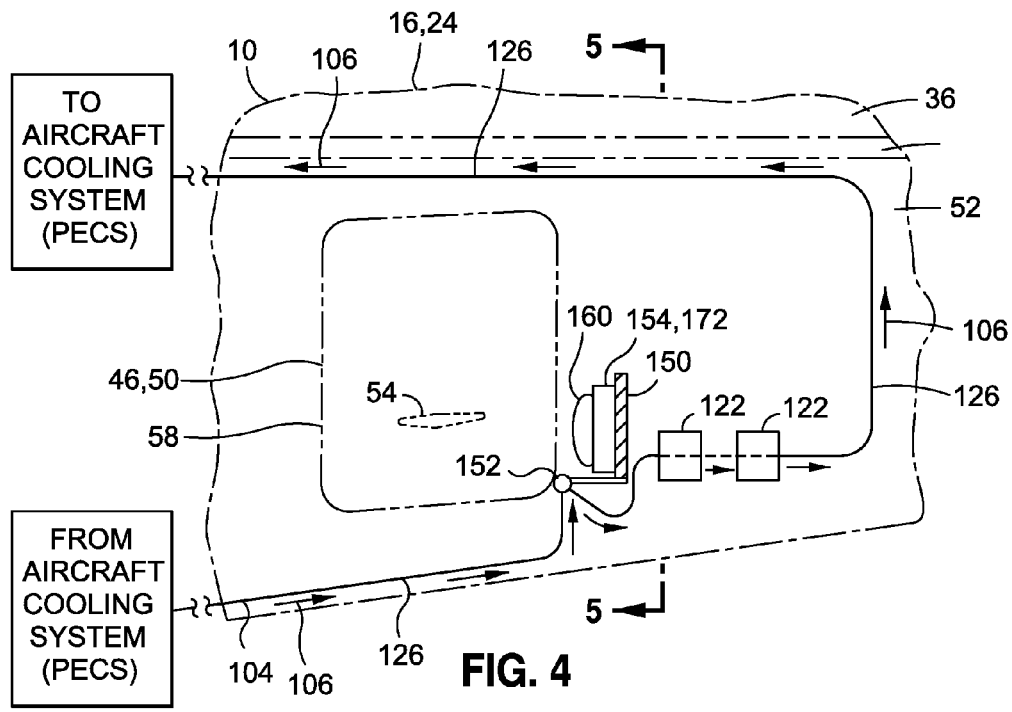
FIG. 4 is a side view of the aft end of the aircraft fuselage taken along line 4 of FIG. 3 and illustrating an embodiment of the deployable liquid cooler in the stowed position mounted adjacent to the cargo door.
Figure 5:
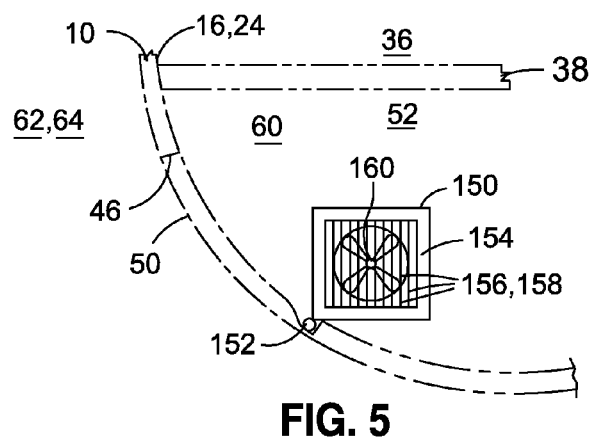
FIG. 5 is a forward view of the fuselage taken along line 5 of FIG. 4 and illustrating the deployable liquid cooler in the stowed position.

Referring to FIGS. 3-5, in an embodiment, the deployable liquid cooler 150 may be contained within the interior 60 (FIG. 5) of the aircraft 10 when the aircraft 10 is in flight as shown in FIG. 3. FIG. 4 illustrates a side view of the fuselage 16 and the deployable liquid cooler 150 in the stowed condition 172 with the cargo door 50 in the closed position 58. The deployable liquid cooler 150 may include the deployable heat exchanger 152 which may be fluidly coupled to the aircraft cooling systems 102 such as to the PECS 110 by means of the conduit 126. The cooling system fluid 104 may flow from the PECS 110 along the flow direction 106 toward the deployable heat exchanger 154. The cooling system fluid 104 may be circulated through the deployable liquid cooler 150. The cooling system fluid 104 may then flow into one or more supplemental cooling units 122 (FIG. 4) which may be located downstream (i.e., along the flow direction 106) of the deployable heat exchanger 154. After passing through the supplemental cooling units 122, the cooling system fluid 104 may be routed toward the forward end 12 of the aircraft 10. The cooling system fluid 104 may be routed to one or more lavatories 44 and/or galleys 42 (FIG. 3) to facilitate venting thereof through one or more exhaust air vents 118 (FIG. 1) such as one or more lavatory galley vents 120 as shown in FIG. 1. The cooling system fluid 104 may be routed back to the aircraft cooling system 102 (FIG. 2) and/or PECS 110 (FIG. 2) at the wing-fuselage juncture 28 (FIG. 2) to complete the loop.

Figure 8:
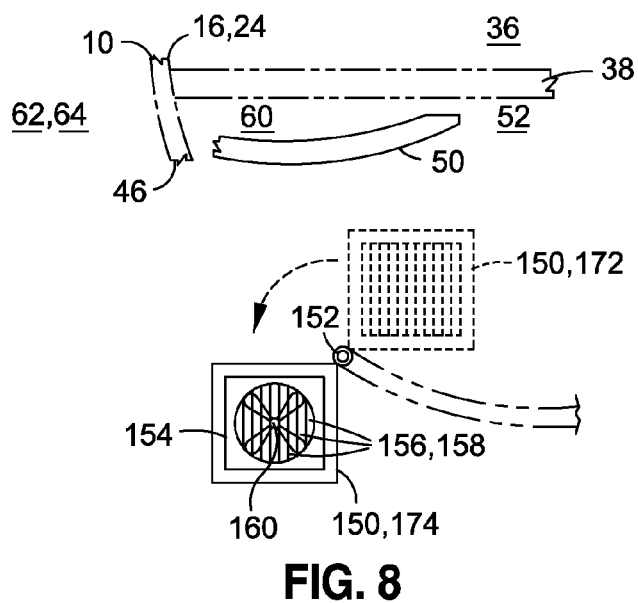
FIG. 8 is a forward view of the fuselage taken along line 8 of FIG. 7 and illustrating the deployable liquid cooler in the deployed position.

Referring to FIG. 4, the deployable heat exchanger 154 may be mounted on a deployment mechanism 152 for moving the deployable heat exchanger 154 between the stowed position 172 and the deployed position 174 (FIG. 8). The deployment mechanism 152 may provide a means for fluidly coupling the deployable heat exchanger 154 to the conduit 126 when the deployable heat exchanger 154 is in the stowed position 172, the deployed position 174, or when the deployable heat exchanger 154 is in an intermediate position between the stowed and deployed position 172, 174. In an embodiment, the deployment mechanism 152 may comprise an articulated hinge (not shown) to facilitate movement of the deployable heat exchanger 154 from the interior position 60 to a position outside 62 the aircraft 10 while fluidly coupling the deployable heat exchanger 154 with the conduit 126 carrying the cooling system fluid 104 from the PECS 110 (FIG. 1) or other aircraft cooling system 102 (FIG. 1) or heat source 108 (FIG. 1). The deployable heat exchanger 154 may include an inlet (not shown) and an outlet (not shown) to couple the deployable heat exchanger 154 to the aircraft cooling system 102 so that the cooling system fluid 104 may circulate through the deployable heat exchanger 154.

Although FIG. 4 illustrates the deployable heat exchanger 154 mounted within a cargo hold 52 adjacent to a cargo door 50, the deployable heat exchanger 154 may optionally be mounted within the cabin 36 of the aircraft 10. For example, the deployable heat exchanger 154 may be mounted adjacent to a passenger door 48 (FIG. 3) of the aircraft 10 cabin 36 and may be deployed by one of the flight crew when the passenger door 48 is opened. However, the deployable heat exchanger 154 may be mounted at any location within the aircraft 10 and is not limited to mounting in the cabin 36 and/or cargo hold 52.

Referring to FIG. 5, shown is a cross section of the aircraft 10 illustrating the deployable heat exchanger 154 located within the cargo hold 52 which may be may be separated from the cabin 36 by a floor 38. The deployable heat exchanger 154 may circulate the cooling system fluid 104 through the deployable heat exchanger 154 in a manner that facilitates the transfer of heat from the cooling system fluid 104 to an environment 64 outside 62 of the aircraft 10 when the deployable heat exchanger 154 is in the deployed position 174 (FIG. 8). For example, the deployable heat exchanger 154 may be provided with a meandering tube 156 and fin 158 arrangement for circulating the cooling system fluid 104. However, deployable heat exchanger 154 may be provided in alternative embodiments for circulating the cooling system fluid 104. For example, the deployable heat exchanger 154 may be provided with a plate-fin arrangement, a mini-tube arrangement, and/or a mini-channel arrangement or other suitable arrangements for transferring heat from the deployable heat exchanger 154 to an environment 64 outside 62 of the aircraft 10.

Figure 7:
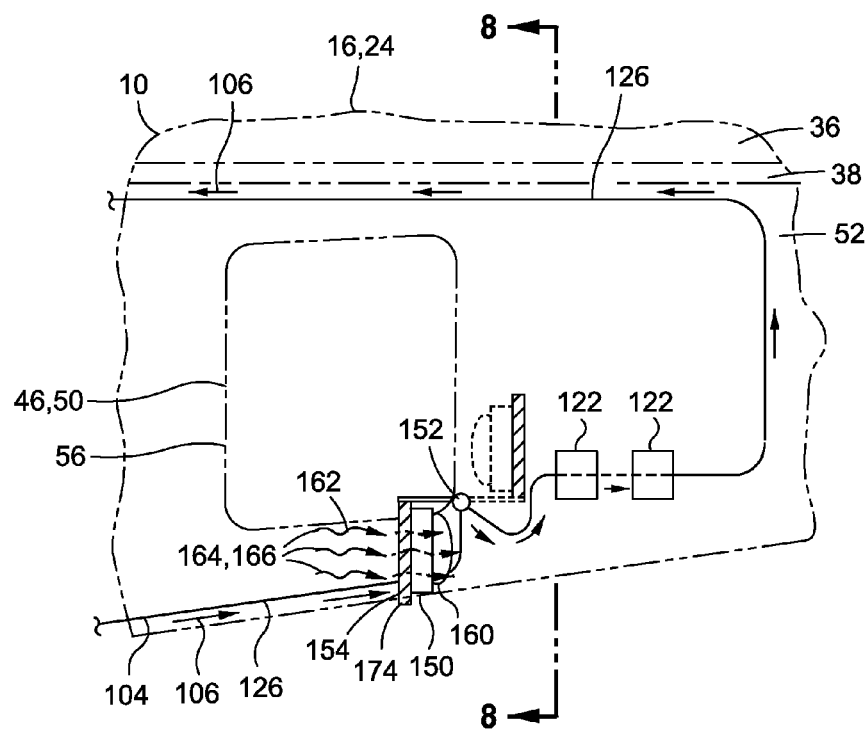
FIG. 7 is a side view of the aft end of the aircraft fuselage taken along line 7 of FIG. 6 and illustrating an embodiment of the deployable liquid cooler in the deployed position.

Referring to FIGS. 6-8, shown is the deployable heat exchanger 154 in the deployed position 174. FIG. 6 is a side view of the aircraft 10 on the ground with the bulk cargo door 50 moved to an open position 56 by means of the door handle 54 (FIG. 4). The deployable heat exchanger 154 is shown in the deployed position 174. FIG. 7 is a side view of the cargo door 50 and showing the deployable heat exchanger 154 in the deployed position 174 and the flow of a cooling medium 162 across the deployable heat exchanger 154. In an embodiment, the aircraft 10 may include a control switch (not shown) for controlling deployment of the deployable heat exchanger 154 from the stowed position 172 (FIGS. 4-5) into the deployed position 174, and vice versa. For example, the control switch may be located in the cabin 36 and/or flight deck 40 (FIG. 1) and may be operated by the flight crew. Alternatively, the control switch may be mounted on an exterior surface of the aircraft 10 such as adjacent to an opening 46 where the deployable heat exchanger 154 is mounted. For example, the control switch may be mounted on an exterior surface of a cargo door 50 for activation by the ground crew. In an embodiment, the deployable heat exchanger 154 may be mounted inside of the opening 46 for the bulk cargo door 50 as the bulk cargo door 50 may be the last door that is closed on the aircraft 10 prior to departure.

Referring to FIGS. 7 and 8, shown is the fuselage 16 and the deployable heat exchanger 154 in the deployed position 174 and exposed to the outside 62 (FIG. 8) environment 64 (FIG. 8). The outside 62 environment 64 may contain a cooling medium 162 (FIG. 7). The cooling medium 162 may comprise the ambient air 164 (FIG. 7) of the outside 62 environment 64 that may flow across the deployable heat exchanger 154 to facilitate the removal of heat from the cooling system fluid 104 (FIG. 7) circulating through the deployable heat exchanger 154. Optionally, the cooling medium 162 may also comprise water 166 (FIG. 7) that may be sprayed onto the deployable heat exchanger 154 such as by the ground crew to facilitate the removal of heat from the cooling system fluid 104. In a further embodiment, the cooling medium 162 may comprise a combination of misted water (not shown) and ambient air that may be sprayed onto or applied to the deployable heat exchanger 154. Even further, the cooling medium 162 may comprise expanded liquid nitrogen (LN2) (not shown) that may be sprayed onto or otherwise applied to the deployable heat exchanger 154.

In response to the application of the cooling medium 162, the deployable heat exchanger 154 may transfer heat contained within the cooling system fluid 104 to the outside 62 environment 64 of the aircraft 10 when the deployable heat exchanger 154 is in the deployed position 174. The cooling medium 162 (e.g., ambient air 164, sprayed water 166, etc.) may absorb heat from the deployable heat exchanger 154 such as when the ambient air 164 flows across the deployable heat exchanger 154.

Figure 9:
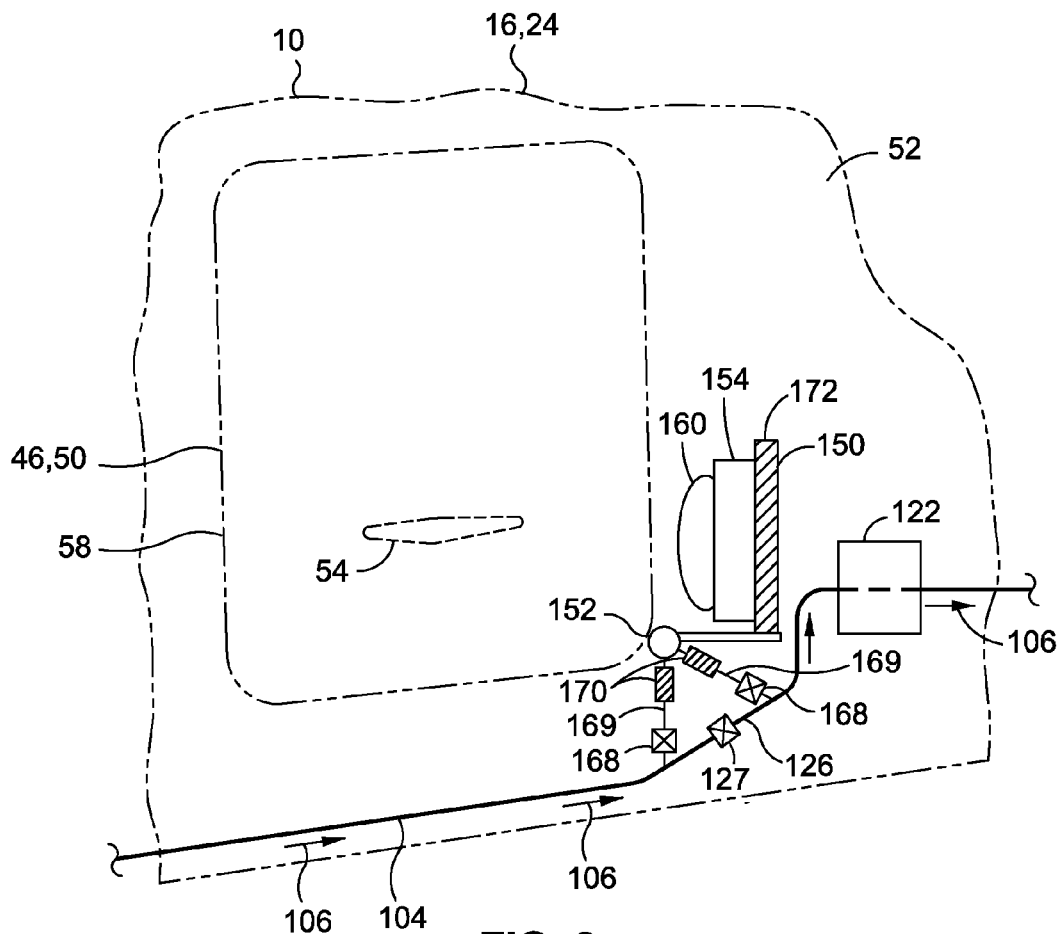
FIG. 9 is a view of the deployable liquid cooler in the deployed position and illustrating a pair of bypass valves and a pair of quick disconnects fluidly coupling the deployable liquid cooler to the conduit.

Referring to FIGS. 8 and 9, in one embodiment, the deployable heat exchanger 154 may include a heat exchanger fan 160 for drawing ambient air 164 across the deployable heat exchanger 154. The heat exchanger fan 160 may be powered by the aircraft electrical power system 112 (FIG. 1) although the heat exchanger fan 160 may be powered by an aircraft 10 hydraulics system (not shown) or by an external power source (not shown) such as a portable ground support generator (not shown). The deployable heat exchanger 154 may be deployed when the ambient air 164 (FIG. 7) on the ground reaches a predetermined temperature. For example, the deployable heat exchanger 154 may be deployed when the ambient air 164 temperature on the ground is at least 90° F. However, the conditions during which the deployable heat exchanger 154 may be deployed may be selected based on any number of factors and is not limited to a specific temperature but may also be dependent upon relative humidity in the air, the temperature of cooling system fluid 104 flowing through the PECS 110, or based on other factors.

Referring still to FIG. 8, the deployable heat exchanger 154 may be sized and configured to provide additional cooling for an aircraft cooling system 102 (FIG. 1) such as the PECS 110 (FIG. 1) for reducing the temperature of the cooling system fluid 104. For example, the deployable heat exchanger 154 may be sized and configured to cooperate with the supplemental cooling units 122 (FIG. 9) to reduce the temperature of the cooling system fluid 104 from a temperature above 130° F. to a temperature of less than 105° F. However, the deployable heat exchanger 154 may be sized and configured to reduce the temperature of the cooling system fluid 104 to any desirable temperature. In an embodiment, the deployable heat exchanger 154 may be provided in a relatively compact physical size. For example, the deployable heat exchanger 154 may be sized to occupy a volume of less than approximately eight (8) cubic feet. However, the deployable heat exchanger 154 may be provided in any size, shape and configuration, without limitation.

The deployable heat exchanger 154 may be configured to circulate cooling system fluid 104 comprised of propylene glycol and water (PGW) although other cooling system fluid 104 compositions may be circulated through the deployable heat exchanger 154. For example, the cooling system fluid 104 may comprise ethylene glycol and water (EGW), or other fluid compositions including, but not limited to, water or liquid helium. In addition, the cooling system fluid 104 may comprise any one of a number of hydrofluoroethers such as the hydrofluoroethers commercially available as 3M™ Novec™ Engineered Fluids from the 3M Company of St. Paul, Minn. The cooling system fluid 104 may also comprise perfluorocarbons such as the perfluorocarbons commercially available as 3M™ Fluorinert™ Electronic Liquid from the 3M Company. The cooling system fluid 104 may further comprise perfluorinated polyethers or hydrofluoropolyethers such as those commercially available as Solvay Solexis Galden™ from Solvay Solexis, Inc. of West Deptford, N.J. Furthermore, the cooling system fluid 104 may comprise an organic heat transfer mixture of ion-exchanged water and trimethylglycine such as the Thermera™ series of heat transfer fluids commercially available from Hydro-Flo Environmental, Ltd. of Bromsgrove, United Kingdom.

Referring to FIG. 9, in an embodiment, the deployable heat exchanger 154 may be configured such that the cooling system fluid 104 may bypass the deployable heat exchanger 154. For example, the deployable heat exchanger 154 may be configured such that the cooling system fluid 104 may bypass the deployable heat exchanger 154 in order to avoid the risk of leakage when the deployable heat exchanger 154 is in the stowed position 172. The cooling system fluid 104 may also bypass the deployable heat exchanger 154 when a leak has been detected in the deployable heat exchanger 154. In this regard, the deployable heat exchanger 154 may be fluidly coupled to the conduit 126 by means of one or more bypass valves 168 that may be installed in one or more conduits 169 coupling the deployable heat exchanger 154 to the conduit 126 of the of aircraft cooling system 102. For example, FIG. 9 illustrates a pair of conduits 169 for carrying cooling system fluid 104 to and from the deployable heat exchanger 154. In such an arrangement, a valve 127 may be included in the portion of the aircraft cooling system conduit 126 located between the juncture of the heat exchanger conduits 169 to the aircraft cooling system 102 (FIG. 1) conduit 126. The valve 127 may be closed and the bypass valves 168 may be opened to force the cooling system fluid 104 to circulate through the deployable heat exchanger 154. Alternatively, the bypass valves 168 may be closed in order to block or prevent the flow of cooling system fluid 104 into and/or out of the deployable heat exchanger 154.

In a further embodiment, the conduits 169 may include one or more disconnect mechanisms such as one or more quick disconnects 170 that may be installed in the conduits 169. For example, each one of the conduits 169 may include a quick disconnect 170 to facilitate separation of the conduits 169 connecting the deployable heat exchanger 154 to the conduit 126 of the aircraft cooling system 102 (FIG. 1). In this regard, disconnection of the quick disconnects 170 may facilitate removal of the deployable heat exchanger 154 from the aircraft 10. For example, during periods when the aircraft 10 is operated primarily in cold weather environments, it may be desirable to remove the deployable heat exchanger 154 from the aircraft 10 to reduce the weight of the aircraft 10 or to increase available volume of the cargo hold 52. The deployable heat exchanger 154 may be re-installed when the aircraft 10 is operated in environments where ambient air temperatures are relatively high or during other conditions that may result in relatively high temperatures of the cooling system fluid 104. In addition, by providing quick disconnects 170 for fluidly decoupling the deployable heat exchanger 154 from the conduit 126 carrying the cooling system fluid 104 around the aircraft 10, removal of the deployable heat exchanger 154 from the aircraft 10 may advantageously facilitate repair and/or maintenance of the deployable heat exchanger 154.

Referring to FIG. 10, shown is a perspective view of an underside of the aircraft 10 and illustrating an embodiment wherein the deployable heat exchanger 154 may be manually or automatically deployed from an opening 46 in a wing-fuselage faring 30 at the wing-fuselage juncture 28 of the aircraft 10. One or more of the deployable heat exchangers 154 may be mounted to the wing-fuselage fairing 30 such as on both sides of the fuselage 16. Advantageously, the mounting of the deployable heat exchanger 154 at the wing-fuselage fairing 30 places the deployable heat exchanger 154 in relatively close proximity to the heat sources 108 and/or aircraft cooling systems 102 of the aircraft 10. In this regard, the deployable heat exchanger 154 may be mounted outside of the pressure vessel 24 such as within the wing-fuselage fairing 30 or at other locations outside of the pressure vessel 24. The pressure vessel 24 may contain the cabin 36 and/or the cargo holds 52. The deployable heat exchanger 154 may be deployed automatically or manually such as by activation of a control switch (not shown) by the flight crew and/or by the ground crew as indicated above.

Figure 11:
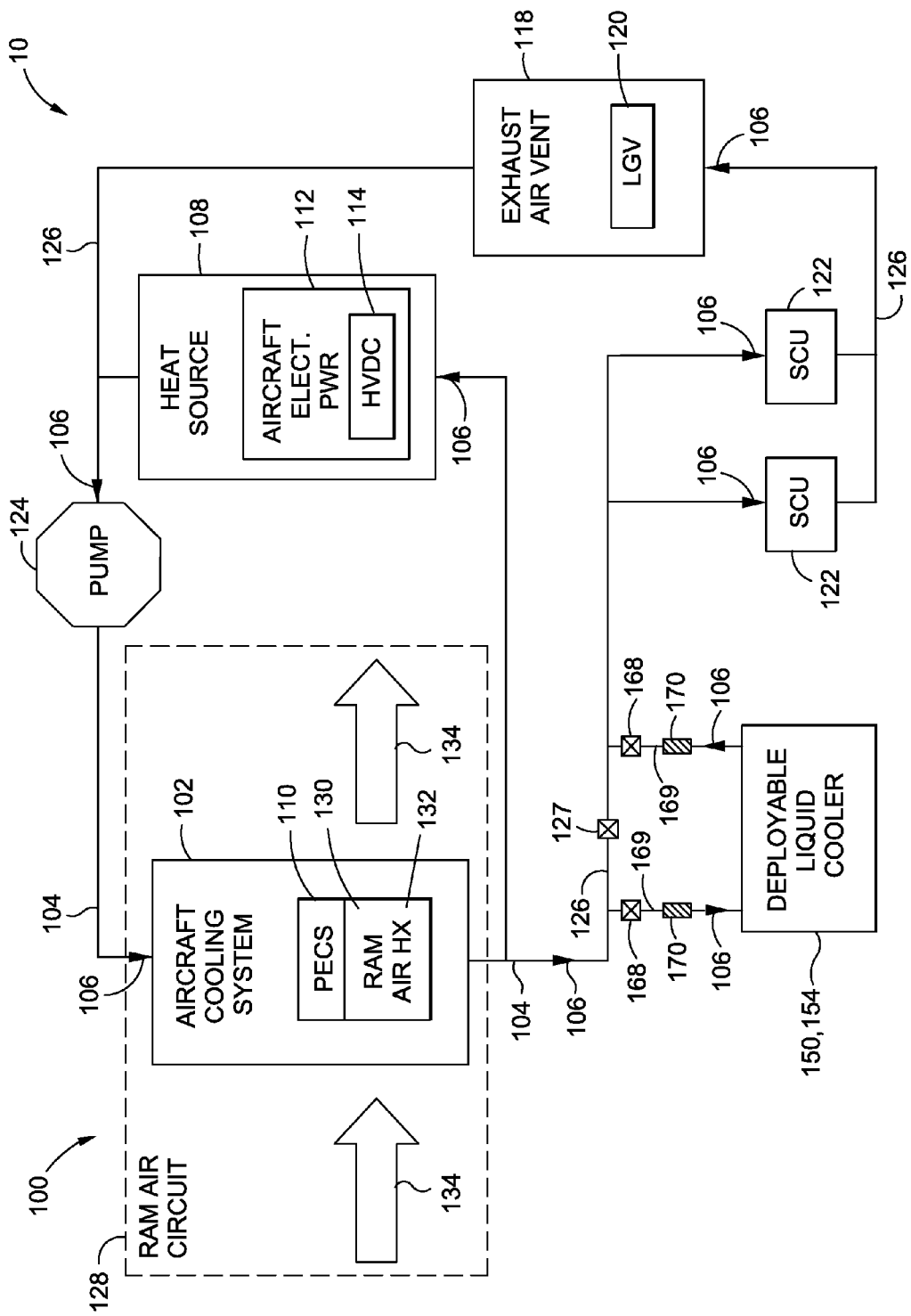
FIG. 11 is a schematic diagram illustrating the interconnectivity of the deployable liquid cooler to the aircraft cooling system.

Referring to FIG. 11, shown is a schematic diagram of an environmental control system 100 (ECS) of the aircraft 10 which may include the deployable liquid cooler 150. In one embodiment shown, the deployable liquid cooler 150 may be fluidly coupled to a downstream side of the aircraft cooling system 102 such as the PECS 110. The PECS 110 may be exposed to a ram air circuit 128 of the aircraft 10. The ram air circuit 128 may draw ambient air through a ram air inlet (not shown). The air 134 may flow across the ram air heat exchanger 130 of the ram air circuit 128. The ram air circuit 128 may facilitate rejection of heat from the cooling system fluid 104 that may be flowing through the PECS 110. The heated air 134 may be discharged out of the aircraft 10 through a ram air outlet (not shown).

In FIG. 11, the deployable liquid cooler 150 may be fluidly interposed between the aircraft cooling system 102 and the one or more supplemental cooling units 122. The heated cooling system fluid 104 may flow from the aircraft cooling system 102 into the deployable liquid cooler 150 where it may be circulated through the deployable liquid cooler 150. As indicated above, the deployable liquid cooler 150 may be configured as a deployable heat exchanger 154 which may be fluidly coupled to the aircraft cooling system 102 by means of one or more conduits 169. A bypass valve 168 may be included in each one of the conduits 169 fluidly coupling the deployable heat exchanger 154 to the conduit 126 of the aircraft cooling system 102. The valve 127 may also be included in the aircraft cooling system 102 conduit 126 as indicated above. The bypass valves 168 and the valve 127 may be manipulated to control the routing of the cooling system fluid 104. For example, by opening the bypass valves 169 and closing the valve 127, the aircraft cooling system fluid 104 is forced to circulate through the deployable heat exchanger 154. Alternatively, by closing the bypass valves 168 and opening the valve 127, the cooling system fluid 104 bypasses the deployable heat exchanger and flows directly toward the supplemental cooling units 122 (SCU).

Referring still to FIG. 11, the supplemental cooling units 122 may be included with the aircraft cooling system 102 to cool air that is recirculated through the cabin 36 (FIG. 1). The galley (not shown) may include galley carts (not shown) that may also require chilling for maintaining the temperature of perishable items contained within the galley carts. The temperature of the recirculated air may be maintained by blowing the recirculated air across a recirculation air heat exchanger (not shown). For cooling the galley carts and the recirculated air, the cooling system fluid 104 may be circulated through the supplemental cooling unit 122 heat exchangers (not shown). The air in the cargo hold 52 may be pumped into the supplemental cooling unit 122 heat exchangers which may reject heat contained in the cooling system fluid 104. The cooled cooling system fluid 104 may then flow from the supplemental cooling units 122 to the galleys and to the recirculation air heat exchangers (not shown).

The cooling system fluid 104 may additionally flow to one or more exhaust air vents 118 such as the one or more lavatory-galley vents 120 (LGVs) located along the aircraft 10 cabin 36 as shown in FIG. 1. The cooling system fluid 104 may flow from the exhaust air vents 118 (e.g., LGVs 120) back toward the aircraft cooling system 102 (e.g., PECS) by means of a pump 124. The pump 124 may also draw the cooling system fluid 104 from one or more heat sources 108 of the aircraft 10. For example, the pump 124 may draw cooling system fluid 104 through the electrical power system 112 of the aircraft 10 such as the HVDC 114 which may provide electrical power to one or more electronic devices or systems of the aircraft 10 as indicated above.

Figure 12:
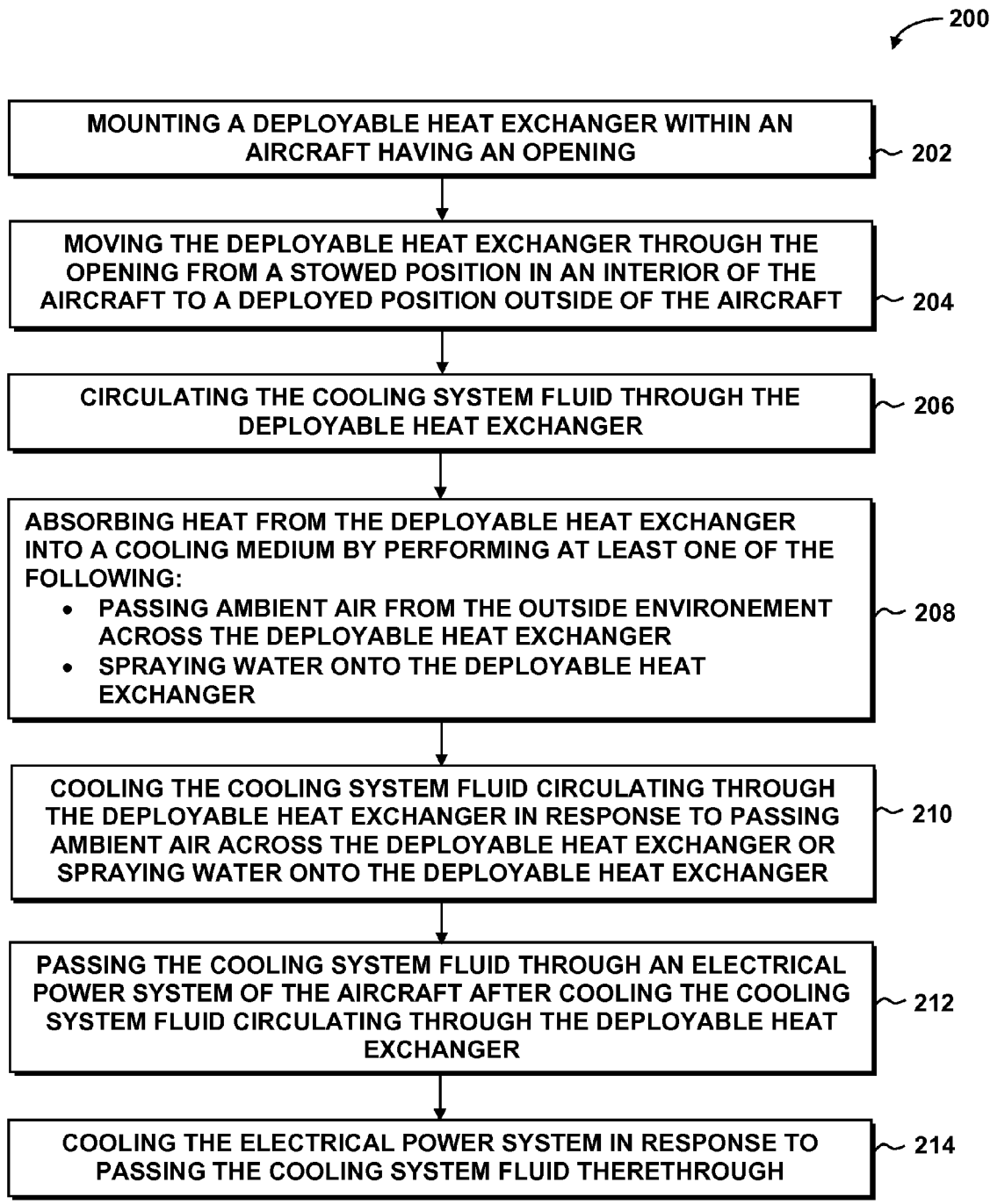
FIG. 12 is an illustration of a flow diagram having one or more operations that may be included in a method of cooling a heat source of an aircraft.

Referring to FIG. 12, shown is a flowchart illustrating one or more operations that may be included in a method for cooling a heat source 108 (FIG. 1) and/or an aircraft cooling system 102 (FIG. 1). For example, the aircraft cooling system 102 may comprise the above-mentioned PECS 110 (FIG. 1) for cooling the HVDC 114 (FIG. 1).

Step 202 of the method of FIG. 12 may include mounting the deployable heat exchanger 154 (FIG. 1) to the aircraft 10 (FIG. 1) such as within the pressure vessel 24 (FIG. 1) of the aircraft 10 fuselage 16 (FIG. 1) which may include the cabin 36 (FIG. 1) and/or cargo hold 52 (FIG. 1). In an embodiment, the deployable heat exchanger 154 may be mounted adjacent to an opening 46 (FIG. 1) in the fuselage 16. The opening 46 may comprise an opening for a cargo door 50 (FIG. 1), a passenger door 48 (FIG. 1), a window, a hatch, or any one or a variety of apertures, slots, cavities, enclosures, or other openings 46 in the fuselage 16. In an advantageous embodiment, the deployable heat exchanger 154 may be mounted within the pressure vessel 24 which may contain a substantial portion of the aircraft cooling system 102 components including, but not limited to, the PECS 110, the air conditioning packs 116 (FIG. 1), the ram air circuit 128, and other systems that make up the ECS 100 of the aircraft 10.

Step 204 of the method of FIG. 12 may include moving the deployable heat exchanger 154 from the stowed position 172 (FIG. 5) within the interior 60 of the aircraft/pressure vessel 24 to the deployed position 174 (FIG. 8) outside 62 of the aircraft/pressure vessel 10, 24 (FIG. 8). In this regard, the deployable heat exchanger 154 may be deployed by moving the deployable heat exchanger 154 through an opening 46 (FIG. 8) in the aircraft/pressure vessel 24 as shown in FIG. 8. In an embodiment, the deployable heat exchanger 154 may be moved to the deployed position 174 outside 62 (FIG. 8) the aircraft 10 when the ambient air outside 62 the aircraft 10 reaches a predetermined temperature.

Step 206 of the method of FIG. 12 may include circulating the cooling system fluid 104 (FIG. 7) through the deployable heat exchanger 154 (FIG. 7). For example, when the deployable heat exchanger 154 is moved into the deployed position 174 as illustrated in FIG. 7, the cooling system fluid 104 may be circulated through the deployable heat exchanger 154 by opening a valve such as the one or more of the bypass valves 168 (FIG. 9) fluidly coupling the deployable heat exchanger 154 to the conduit 126 carrying the cooling system fluid 104 throughout the aircraft 10. The valve 127 (FIG. 9) may be closed when the bypass valves 168 are opened causing the cooling system fluid 104 to flow through the deployable heat exchanger 154.

Step 208 of the method of FIG. 12 may include absorbing heat of the cooling system fluid 104 (FIG. 7) into a cooling medium 162 (FIG. 7) that may be passed across the deployable heat exchanger 154. For example, FIG. 7 illustrates ambient air 164 of the outside 62 (FIG. 8) environment 64 (FIG. 8) flowing across the deployable heat exchanger 154 and absorbing heat contained within the cooling system fluid 104 circulating through the deployable heat exchanger 154. In an embodiment, the cooling medium 162 may additionally include water 166 (FIG. 7) that may be sprayed onto or otherwise provided to the deployable heat exchanger 154. The water 166 may be sprayed on the deployable heat exchanger 154 in the deployed position 174 and may absorb heat from the cooling system fluid 104 circulating through the deployable heat exchanger 154.

Step 210 of the method illustrated in FIG. 12 may include cooling the cooling system fluid 104 (FIG. 7) circulating through the deployable heat exchanger 154 (FIG. 7) in response to ambient air 164 (FIG. 7) flowing across the deployable heat exchanger 154 or in response to water 166 (FIG. 7) or other cooling medium 162 (FIG. 7) sprayed onto or applied to the deployable heat exchanger 154. In this regard, the deployable heat exchanger 154 may facilitate the exchange of heat in the cooling system fluid 104 with the ambient air 164 and/or water 166.

Step 212 of the method of FIG. 12 may include passing the cooling system fluid 104 (FIG. 11) through an electrical power system 112 (FIG. 11) of the aircraft 10 (FIG. 11) after the cooling system fluid 104 has been circulated through the deployable heat exchanger 154 (FIG. 11). In an embodiment, the electrical power system 112 may comprise the one or more HVDC 114 (FIG. 11) equipment racks. However, the cooling system fluid 104 may be circulated through one or more cooling systems 102 (FIG. 11) of the aircraft 10 including, but not limited to, the PECS 110 (FIG. 11) and/or one or more air conditioning packs 116 (FIG. 1) or other cooling systems 102 of the aircraft 10.

Step 214 of the method of FIG. 12 may include cooling the electrical power system 112 (e.g., HVDC 114) (FIG. 11) in response to circulating the cooling system fluid 104 (FIG. 11) through the PECS 110 (FIG. 11). In an embodiment, the electrical power system 112 may be cooled by circulating the cooling system fluid 104 through a ram air heat exchanger 130 as shown in FIG. 11. Air 134 (FIG. 11) may be drawn from outside 62 of the aircraft 10 (FIG. 7) and may be passed across the ram air heat exchanger 130 for absorbing heat from the cooling system fluid 104 circulating through the ram air heat exchanger 130. In an embodiment, a ram air fan 132 (FIG. 11) may be activated for facilitating the drawing of air across the ram air heat exchanger 130.

Advantageously, the deployable heat exchanger 154 (FIG. 1) as disclosed herein may facilitate thermal management of one or more aircraft 10 (FIG. 1) systems. For example, the deployable heat exchanger 154 may supplement cooling provided by the ram air heat exchanger 130 (FIG. 11) which may be limited in its capacity to cool the aircraft cooling systems 102 (FIG. 1) during ground operations on relatively hot days. Advantageously, by including the deployable heat exchanger 154 instead of increasing the physical size or capacity of the ram air circuit 128 (FIG. 1), the impact on the existing environmental control systems 100 configuration may be minimized. In addition, the deployable heat exchanger 154 may be added with minimal or negligible impact on in-flight performance of the aircraft 10.

By including a remotely located deployable heat exchanger 154 (FIG. 8) which may be deployed into the environment 64 (FIG. 8) outside 62 (FIG. 8) of the aircraft 10 (FIG. 8), cooling efficiency may be provided to a greater extent than the cooling that may be available by increasing the size of the ram air circuit 128 (FIG. 2). For example, increasing the size of the ram air circuit 128 may necessitate increasing the opening of a ram air inlet which may adversely affect aerodynamic performance of the aircraft 10 by increasing aerodynamic drag. A further advantage provided by the deployable heat exchanger 154 is that when an increase in the length or size of the aircraft 10 is required by stretching a given aircraft configuration to accommodate a greater number of passengers, the cooling system requirements of the aircraft 10 may be satisfied by adding the deployable heat exchanger 154 without impacting the existing design of the environmental control system 100 (FIG. 2).

Many modifications and other embodiments of the disclosure will come to mind to one skilled in the art to which this disclosure pertains having the benefit of the teachings presented in the foregoing descriptions and the associated drawings 26. The embodiments described herein are meant to be illustrative and are not intended to be limiting or exhaustive. Although specific terms are employed herein, they are used in a generic and descriptive sense only and not for purposes of limitation.

What is claimed is:

1. A deployable liquid cooler for an aircraft, comprising:
 a heat exchanger fluidly coupled to at least one heat source of the aircraft and configured to receive a cooling system fluid from the heat source for circulation through the heat exchanger;
 the heat exchanger being movable between a stowed position in the aircraft interior and a deployed position outside of the aircraft; and
 the heat exchanger being configured to transfer heat of the cooling system fluid to an environment outside the aircraft when the heat exchanger is in the deployed position.

2. The deployable liquid cooler of claim 1 wherein:
 the heat exchanger includes a fan drawing a cooling medium across the heat exchanger.

3. The deployable liquid cooler of claim 1 wherein:
 the heat source comprises a cooling system of the aircraft.

4. The deployable liquid cooler of claim 3 wherein:
 the cooling system comprises an aircraft power electronics cooling system for cooling an electrical power system of the aircraft.

5. The deployable liquid cooler of claim 3 wherein:
 the cooling system includes a ram air circuit having a ram air heat exchanger for circulating the cooling system fluid therethrough; and
 the heat exchanger receiving the cooling system fluid circulated through the ram air heat exchanger.

6. The deployable liquid cooler of claim 3 wherein:
the aircraft comprises a pressure vessel containing at least a portion of the aircraft cooling system; and
the heat exchanger being movable between the stowed position in an interior of the pressure vessel and the deployed position outside of the pressure vessel.

7. The deployable liquid cooler of claim 6 wherein:
the pressure vessel comprises at least one of an aircraft cabin and a cargo hold.

8. The deployable liquid cooler of claim 1 wherein:
the heat exchanger is movable through an opening in the aircraft; and
the opening comprising an opening for at least one of a cargo door, a passenger door, a window, and a hatch.

9. The deployable liquid cooler of claim 1 further comprising:
at least one bypass valve configured to selectively block a flow of the cooling system fluid through the heat exchanger.

10. The deployable liquid cooler of claim 1 further comprising:
at least one conduit fluidly coupling the heat exchanger to an aircraft cooling system; and
at least one quick disconnect installed in the conduit and being configured to decouple the heat exchanger from the aircraft cooling system.

11. The deployable liquid cooler of claim 1 wherein the cooling system fluid comprises at least one of the following:
water;
liquid helium;
ethylene glycol and water;
propylene glycol and water;
hydrofluoroethers;
perfluorocarbons;
perfluorinated polyethers;
hydrofluoropolyethers; and
a mixture of ion-exchanged water and trimethylglycine.

12. An aircraft having an interior, comprising:
a deployable heat exchanger fluidly coupled to at least one of a heat source and a cooling system of the aircraft;
the deployable heat exchanger being configured to receive cooling system fluid from the heat source for circulation through the deployable heat exchanger;
the deployable heat exchanger being movable between a stowed position in the aircraft interior and a deployed position outside of the aircraft; and
the deployable heat exchanger being configured to transfer the heat of the cooling system fluid to an environment outside of the aircraft when the deployable heat exchanger is in the deployed position.

13. A method of cooling a heat source of an aircraft having an aircraft cooling system containing a cooling system fluid, comprising the steps of:
moving a deployable heat exchanger from a stowed position in an interior of the aircraft to a deployed position outside of the aircraft;
circulating the cooling system fluid through the deployable heat exchanger;
absorbing heat from the deployable heat exchanger into a cooling medium applied to the heat exchanger; and
cooling the cooling system fluid in response to absorbing heat into the cooling medium.

14. The method of claim 13 wherein the step of absorbing heat from the deployable heat exchanger into the cooling medium comprises at least one of the following:
passing ambient air from outside the aircraft across the deployable heat exchanger; and
applying at least one of the following to the deployable heat exchanger:
water;
misted water and air; and
expanded liquid nitrogen.

15. The method of claim 13 further comprising the steps of:
passing the cooling system fluid through an electrical power system of the aircraft after cooling the cooling system fluid circulating through the deployable heat exchanger; and
cooling the electrical power system in response to passing the cooling system fluid therethrough.

16. The method of claim 15 wherein the step of cooling the electrical power system comprises:
circulating the cooling system fluid through a power electronics cooling system fluidly coupled to the electrical power system.

17. The method of claim 16 wherein the step of circulating the cooling system fluid through the power electronics cooling system comprises:
circulating the cooling system fluid through a ram air heat exchanger; and
passing air across the ram air heat exchanger.

18. The method of claim 13 further comprising the steps of:
mounting the deployable heat exchanger adjacent to an opening of at least one of a cargo door, a passenger door, a window, and a hatch; and
deploying the deployable heat exchanger through the opening.

19. The method of claim 13 further comprising the steps of:
mounting the deployable heat exchanger within a pressure vessel, the pressure vessel containing a substantial portion of the aircraft cooling system; and
moving the deployable heat exchanger through an opening in the pressure vessel into the deployed position outside of the pressure vessel.

20. The method of claim 13 further comprising the step of:
moving the deployable heat exchanger to the deployed position outside the aircraft when ambient air outside the aircraft reaches a predetermined temperature.

* * * * *